(12) United States Patent
Landrock

(10) Patent No.: US 7,362,869 B2
(45) Date of Patent: Apr. 22, 2008

(54) METHOD OF DISTRIBUTING A PUBLIC KEY

(75) Inventor: Peter Landrock, Cambridge (GB)

(73) Assignee: Cryptomathic A/S, Arhus (DK)

( * ) Notice: Subject to any disclaimer, the term of this patent is extended or adjusted under 35 U.S.C. 154(b) by 610 days.

(21) Appl. No.: 10/497,674

(22) PCT Filed: Dec. 10, 2002

(86) PCT No.: PCT/DK02/00840

§ 371 (c)(1),
(2), (4) Date: Nov. 4, 2004

(87) PCT Pub. No.: WO03/050774

PCT Pub. Date: Jun. 19, 2003

(65) Prior Publication Data

US 2005/0069137 A1     Mar. 31, 2005

(30) Foreign Application Priority Data

Dec. 10, 2001   (DK) .............................. 2001 01834

(51) Int. Cl.
*H04L 9/00* (2006.01)

(52) U.S. Cl. .................. 380/277; 380/278; 380/282; 380/44; 713/168

(58) Field of Classification Search ................ 380/270, 380/277–278, 282, 44; 713/168–170, 181, 713/189, 192

See application file for complete search history.

(56) References Cited

U.S. PATENT DOCUMENTS

| 5,661,806 | A | 8/1997 | Nevoux et al. | |
|---|---|---|---|---|
| 7,050,993 | B1 * | 5/2006 | Piikivi et al. | ................. 705/26 |
| 2001/0041593 | A1 | 11/2001 | Asada | |
| 2002/0018569 | A1 * | 2/2002 | Panjwani et al. | ........... 380/247 |

FOREIGN PATENT DOCUMENTS

| DE | 44 42 357 | 6/1996 |
|---|---|---|
| DE | 198 20 422 | 11/1999 |
| DE | 100 05 487 | 8/2001 |
| EP | 0 532 227 | 3/1993 |
| EP | 0 532 231 | 3/1993 |
| EP | 0 827 356 | 3/1998 |
| EP | 1 111 561 | 6/2001 |

(Continued)

*Primary Examiner*—Hosuk Song
(74) *Attorney, Agent, or Firm*—Ladas and Parry LLP

(57) ABSTRACT

A method of distributing the public key of an asymmetric key pair with a private key and the public key from a mobile station to a key managing computer, the method include the steps of: communicating a password (OTP) from the key managing (203) computer to the mobile station (209) of a registered user (201) by a secure channel (202) to thereby provide a shared secret; at the mobile station and at the key managing computer, generating a first code (MAC1) and a second node (MACT1), respectively, based on the same predefined generation method, which codes (MAC1; MACT1) are generated from the password (OTP); by the mobile station (209), transmitting the public key and the first code (MAC1) to the key managing computer (203); at the key managing computer (203), receiving the public key and the first code (MAC1) from the mobile station (209); checking the authenticity of the registered user (201) based on comparing the first code (MAC1) and the second code (MACT1).

22 Claims, 3 Drawing Sheets

FOREIGN PATENT DOCUMENTS

| | | |
|---|---|---|
| FR | 2 769 446 | 4/1999 |
| WO | 91/16691 | 10/1991 |
| WO | 95/15066 | 6/1995 |
| WO | 97/15161 | 4/1997 |
| WO | 98/37663 | 8/1998 |
| WO | 01/76297 | 10/2001 |
| WO | 01/84761 | 11/2001 |

* cited by examiner

METHOD OF DISTRIBUTING A PUBLIC KEY

The invention relates to a method of distributing the public key of an asymmetric key pair with a private key and the public key from a mobile station to a key managing computer. The invention further relates to an application module arranged on a smart card, which is registered to a user for use of the smart card in a mobile terminal.

BACKGROUND

Mobile stations, such as mobile phones, have become very popular during the recent years and are spreading rapidly to become an item everyone owns. The availability of mobile stations and their widespread distribution together with the realization that mobile stations are in fact sophisticated communication devices has led to the introduction of m-commerce (mobile commerce)—mobile stations as means for conducting payments for goods or services.

When using the mobile station for conducting payments, it is very important that e.g. a bank receiving information from a mobile station containing payment instructions, not only can trust that the received request originates from the owner of the account but actually prove to a third party that the owner must have generated the received payment instruction. A method of checking the above could be by storing the owners phone number together with the account number and then when receiving a request, checking whether the number of the phone transmitting the request corresponds to the stored phone number.

A problem with the above is that unauthorised access to an account is possible by using e.g. a stolen mobile phone, because in the above example the bank trusts that the person using a mobile phone is the rightful owner of the mobile phone. Or even worse, the information used for identification could be stolen for masquerading purposes, e.g. to fraudulently pretending to have the identity of someone else, or to retrieve more information, e.g. sensitive information, by listening to communications between the mobile phone and the bank.

To prevent unauthorised access to information in general, and to accounts in particular, it is well known to use encryption of information. The purpose for encryption is to convert human readable information into something unreadable (and decryption is by definition the reverse). The reason to use encryption is in general to convert e.g. private and/or sensitive information into a form that only a person/a device who knows how to decrypt it can read it. There are two basic forms of encryption are symmetric and asymmetric cryptography. In symmetric encryption, the same special "key" is used to encrypt and decrypt the data. In asymmetric encryption the sender and the receiver each possess a key pair containing a public key and a private key.

Even if symmetric encryption was used to secure a communication between a mobile station and the bank, the system would not offer non-repudiation, i.e. it would not be possible for the bank to prove that a certain person had initiated the payment.

The technology available today enables the owner of a mobile terminal to initiate a public key generation on the mobile terminal. But the challenge, which is addressed by the present invention, is subsequently to communicate the public key of the device to a key managing computer, representing e.g. as banks, in a secure manner.

The obvious alternative is to introduce a so-called Public Key Infrastructure (PKI), where the public keys of the users are made available in a central database used a so-called certificate. But this entails a number of practical problems, which can be quite tedious and expensive.

When a PKI is established, one of the most tedious steps of the whole process is the identification and registration of the public keys of the users.

In the X.509 or the EMV approach this is typically achieved in one of the following ways:

1) The public keys pairs are generated centrally, the private key is stored on a device such as a chip card protected by a PIN-code, the user is being identified and a certificate is generated which ties the ID of the user to the public key. The device is then communicated through one channel to the user and the PIN-code through another, e.g. via PIN-mail.
2) Independently of how the keys have been generated, the user, after having been physically identified goes through a process of registering his public key. One method which is widely adapted is to print a hash imprint of the public key, sign this with an old-fashioned, hand-written signature, forward it to the bank by personal delivery or by sending it by the traditional postal services and then transmitting the public key electronically as well for the purpose of e-commerce between parties.

To avoid building such an extensive infrastructure, it is therefore an object of the present invention to provide a method for the bank to register the public key of a mobile device in a secure manner without the involvement of paper based routines, and subsequently receiving a request from a mobile station to check whether the mobile station is being operated according to the intention of the owner and thereby can be trusted.

The object can also be defined in more general terms.

It is desirable to find a method for a first party to receive information from a second party using a mobile station, such as a mobile phone, where the first party can thrust that the second party really is the party identified by the mobile communication device.

PRIOR ART

EP 1 111 561 A2 describes a system for performing a transaction, comprising a communication device, a first party and a second party. Here the second party enters a password on the mobile phone and the password is transmitted together with the request. The first party then checks the received password and if it is accepted the first party trusts that the second party is the party identified by the mobile phone. This arrangement transmits the password using the communication network, it is therefore possible for others to sniff the communication network and thereby obtain the password.

SUMMARY OF THE INVENTION

The above and other problems are solved when the method mentioned in the opening paragraph comprises the steps of:
communicating a password from the key managing computer to the mobile station of a registered user by means of a secure channel to thereby provide a shared secret;
at the mobile station and at the key managing computer, generating a first code and a second code, respectively, based on the same predefined generation method, which codes are generated from the password;

by means of the mobile station, transmitting the public key and the first code to the key managing computer;

at the key managing computer, receiving the public key and the code from the mobile station;

checking the authenticity of the registered user by comparing the first code and the second code.

Thereby, the problems of the prior art can be solved, by providing the possibility to distribute a public key generated at a mobile station, from the mobile station to a key managing computer, in a secure manner. The method according to the invention could e.g. be used for establishing communication authentication, i.e. information exchange with authentication and integrity. The password could e.g. be a One Time Password, and the secure channel could be a channel of the type known for secure communication on the Internet.

In a preferred embodiment the first and second codes are generated from the password in combination with the said public key as a Message Authentication Code. Thereby, the integrity of the public key can be checked.

In another preferred embodiment, the asymmetric key pair is generated by said mobile station, and the generation of said asymmetric key pair is initiated by the password being entered into the mobile station. Thereby, the private key is generated locally once for use in sending encrypted signatures between the mobile station and other units.

In yet another preferred embodiment a user authentication is attached to the private key during generation of said asymmetric key pair, where the user authentication must be entered when the private key is to be accessed. The authentication could e.g. be a pin code or biometrics (fingerprint, eye iris recognition, etc.). Thereby every access to and use of the private key has to be confirmed by using the authentication, enhancing security of the communication. Hereby, authentication is improved when using asymmetric key encryption.

When the predefined generation method in the method according to the invention comprises the following steps: generating a string at least comprising said password, and hashing the string using a predefined hashing function, a particularly advantageous embodiment is obtained. The hashing function could e.g. be a secure hash algorithm, such as SHA-1.

In yet another embodiment the method further comprises the step of: if, by comparing the first code and the second code, a match is found, the registered user is authenticated and a further code, which is generated from a second public key in a second asymmetric key pair of the key managing computer and the password, is transmitted to the mobile station.

Hereby, the mobile station is authenticated to the key managing computer, and the key managing computer transmits a further code to the mobile station to provide the possibility for mutual authentication of communication between the mobile station and the key managing computer. The public key of the key manager computer can be the same for a plurality of registered users, or alternatively the key managing computer can apply a unique public key for each registered user. It should be noted, that the transmission of the further code is transmitted to the smart card in the mobile station.

Preferably, the method further comprises the step of: at the mobile station generating a temporary code based on the second public key and the password by means of the predefined generation method; comparing the further cc and the temporary code; and if, by comparing the further code and the temporary code, a match is found, the mobile station accepts the second public key for subsequent secure communication with the key managing computer. Hereby, the possibility of secure communication between the mobile station and the key managing computer is provided.

In another preferred embodiment, the secure channel, which is used to communicate the password from the key managing computer to the mobile station of the registered user to thereby provide a shared secret, is a channel where the mobile station and the key managing computer are authenticated to each other. Thereby, use of a pre-established secure channel is made to ensure that the password cannot be known by unauthorized persons, and the authenticity between the mobile station and the key managing computer is ensured.

In an embodiment, the mobile station comprises a smart card and the private key is generated and stored at a first application on the smart card, and wherein the first code is generated at a second application at the smart card. Thereby, the private key only exists in a secure storage on the smart card of the mobile station, such as an EEPROM, which EEPROM can be protected by a PIN-code or similar only known by a registered user. The first and second applications could be one module on the smart card, but preferably they are distinct.

When the smart card is a Subscriber Identity Module (SIM card), the method is particularly advantageous for use in a mobile station, e.g. a mobile telephone.

In yet another embodiment, the key managing computer represents at least one financial institute, such as a bank, and the mobile station is registered to a costumer with an account in said at least one financial institute. In the field of financial transactions, it is especially important, that communication can be authenticated.

In yet another embodiment, the communication between the mobile station and the key managing computer is performed by a cellular network.

Additionally, the invention relates to an application module arranged on a smart card, which is registered to a user for use of the smart card in a mobile station; and wherein the application module is configured to receive a password entered by the user, and to generate and store an asymmetric key pair with a public key and a private key. According to the invention, the application module is configured to: generate a first code based on the same predefined generation method as is used for generating a second code at a specified key managing computer, which first and second codes are generated from the password as a Message Authentication Code; via the mobile station, transmit the public key and the first code to the specified key managing computer to enable authentication of the registered user's public key, based on comparing the first and second code.

Consequently, the public key is transmitted to the specified key managing computer without further interaction by the user. By this automatic procedure of interaction between the smart card and the key managing computer both the risk of introducing errors and the time consumption involved in the distribution of public keys is reduced.

In a preferred embodiment, the application module is configured to: generate the private key and the public key; generate the code; and perform encryption and/or decryption operations of messages based on the private and/or public key. Thereby, all major functions which requires a relatively high level of security can be closely integrated.

Preferably, the application module is configured to: receive the password and a further code, which is generated from a second public key in a second asymmetric key pair of the key managing computer; generate a temporary code based on the received public key, which is received from the specified key managing computer, and the password by means of the predefined generation method; compare the further code and the temporary code; if, by comparing the further code and the temporary code, a match is found, the mobile station accepts the second public key for subsequent secure communication with the key managing computer. Thereby, it is possible to download the public key of the specified key managing computer—and to verify that it indeed originates from this very computer—i.e. performing authentication of the public key of the key managing computer. In connection herewith, the further code is temporary in the sense of providing it as directly as possible to the smart card for use in the application module only. Thus, when the temporary code has been transmitted to the smart card it can be discarded at the premises of the key managing computer, and when the smart card has used it for authentication purpose it may likewise be discarded.

BRIEF DESCRIPTION OF THE DRAWINGS

The invention will be explained more fully below in connection with a preferred embodiment and with reference to the drawing, in which.

DESCRIPTION OF A PREFERRED EMBODIMENT

Figure 1:
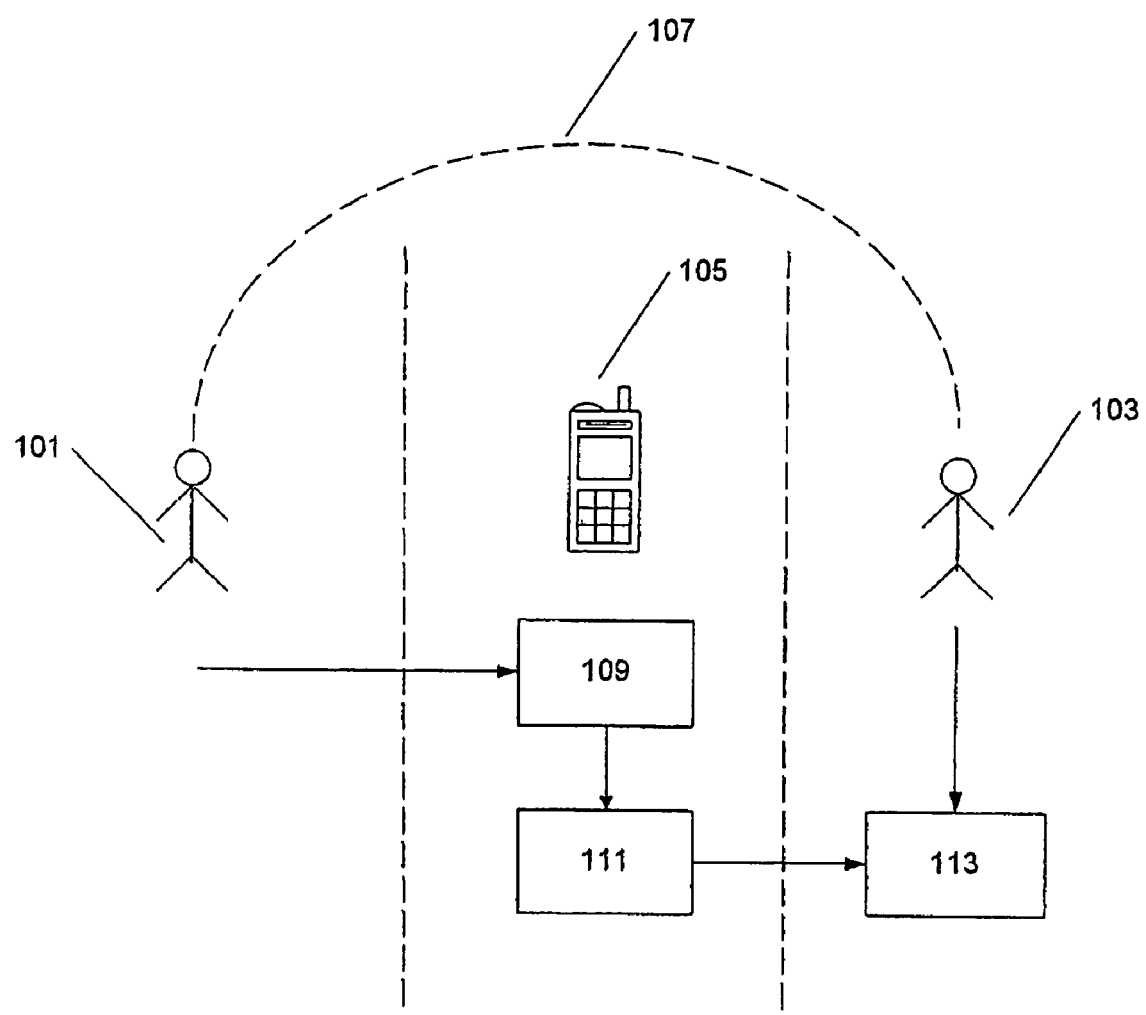
FIG. 1 shows a flow chart of the general idea of the authentication process.

FIG. 1 shows a flow chart of the general idea of the authentication process. A first party 103 are receiving information from a mobile communication device 105 and the first party can authenticate that the received information really is from the second party 101 being identified by the mobile phone, e.g. using knowledge of the phone number of the mobile communication device. This information can be authenticated because the received information comprises identification information, which has been shared by the first and second party using a secure line 107, such as e.g. a secure Internet connection.

An example is that the first party 103 and the second party 101 have shared some identification information using the secure line 107. When the first party 101 sends a message to the second party 103 using a mobile communication device 105, the identification information is first used to generate a code 109 before transmission. The generated code is then transmitted to the second party 103 together with the message 111. The second party 103 can authenticate the message by checking the integrity of the received code 113. This check is performed using the identification information and knowledge about the generation of the code based on cryptographic techniques well-known by people skilled in the art.

The described authentication method can be used in a number of different situations where authentication is necessary when using a mobile communication device for communication. An important feature of the invention is that the identification information only is used locally at the first party or the second party and therefore never is transmitted during normal secure communication between the first and second party.

In the following a specific embodiment is described where the authentication method is used during communication between a bank and a mobile phone used by a costumer. The authentication method described above is here used for authenticating the sharing of asymmetric public keys. When the asymmetric public keys have been exchanged they may be used for asymmetric key signature generation and verification during the subsequent communication between the bank and the costumer. The remaining communication could e.g. be that the costumer uses the mobile phone for performing payment transactions from his bank account or one of his bank accounts. Such subsequent applications are not further addressed in the present invention.

Figure 2:
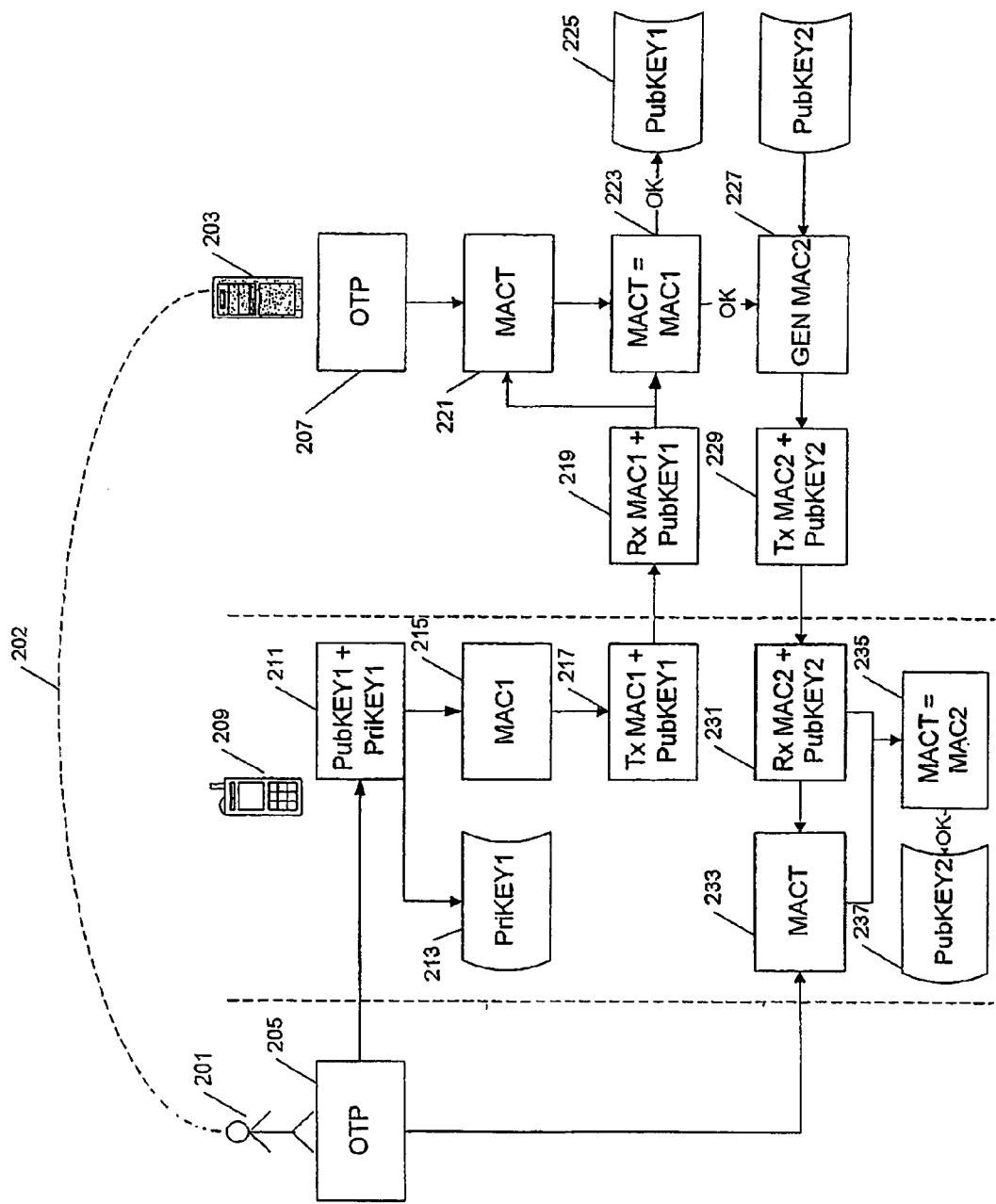
FIG. 2 shows an embodiment of a more detailed flow chart of the authentication process.

FIG. 2 shows an embodiment of the more detailed flow chart of the authentication process.

A costumer 201 and a bank server 203 initially exchange some shared identification information, e.g. a One-Time-Password (OTP), using a secure communication line 202. The costumer is e.g. a user of an Internet bank service in the bank and the OTP is obtained through an existing secure Internet bank channel between the costumer and the bank.

In the following a flow describing an example of how the OTP could be obtained through an Internet bank:

The costumer uses a menu in the Internet bank to register as user of a Mobile Payment Service and enters the required information. The following information is an example of what might have to be defined upon registration:

MobilePhoneNumber
    This is the GSM MSISDN of the mobile phone subscription.
Operator
    This is the operator who owns the customers mobile subscription.
AccountNumber
    This is the account that the costumer has selected to use in the Mobile Payment Service and from which the money will be withdrawn.

After the costumer has registered to the service, the bank could e.g. send a request to the operator to issue and distribute a new SIM card supporting a Mobile Payment Service application. In another embodiment the application could already have been placed on the SIM card. As mentioned earlier the OTP could be provided via the existing secure Internet Bank channel to the costumer.

The costumer enters the OTP on the mobile phone and the mobile phone 209 generates an asymmetric key pair using a key generator 211. The asymmetric key pair comprises a private key (PriKEY1) and a public key (PubKEY1). The private key is stored in a tamper resistant location 213 on the SIM card.

The public key is transmitted to a code generator 215 on the device, for generating a message authentication code (MAC1). The code generator 215 generates the authentication code using both the OTP and the public key using standard cryptographic techniques, e.g. MAC-generation. The generator on the SIM card could e.g. calculate a keyed message digest based on SHA-1. The input is a concatenated string of all the information sent in the message (including the public key) and the OTP. In an embodiment the generated message digest is 20 bytes, but is truncated to the first 8 bytes to create an authentication code.

A transmitter 217 transmits the generated authentication code and the public key to the bank server 203, e.g. by using a SM message.

A receiver 219 at the bank server 203 then receives the public key (PubKEY1) and the authentication code (MAC1) from the mobile phone 209. The received public key and the OTP 207 is then used as input to a code generator 221 and a temporary message authentication code (MACT) is generated using the public key and the OTP in a way similar to the code generation at the mobile communication device.

The authentication and integrity of the received public key is checked 223 by comparing the received authentication code (MAC1) with the temporary authentication code (MACT1). If the codes correspond to each other, according to a predefined set of rules (typically are identical), the received public key is considered properly authenticated. The bank server 203 can trust that the public key is from the costumer 201 and the public key is stored 225.

Now the bank server has authenticated the received public key and in the following it is described how the bank server similarly transmits a public code to be authenticated by the mobile phone.

An asymmetric key pair has previously been generated and stored locally the bank. The stored public key (Pub-KEY2) is transmitted to a code generator 227, for generating a message authentication code (MAC2). The code generator 227 generates the authentication code using both the OTP and the public key (PubKEY2). A transmitter 229 transmits the generated authentication code and the public key to the mobile communication device 209. The information could e.g. be communicated using SMS PP DD.

A receiver 231 at the mobile communication device 209 then receives the public key (PubKEY2) and the authentication code (MAC2) from the bank server 203. The received public key and the OTP 205 is then used as input to a code generator 233 on the public device and a temporary message authentication code (MACT2) is generated using the public key and the OTP in a way similar to the code generation at the bank server.

The authentication is checked by comparing 235 the received authentication code (MAC2) with the temporary authentication code (MACT2) and if the codes correspond to each other, according to a predefined set of rules (typically are identical), the message is authenticated and the bank server can trust that the received information is from the bank server and the public key is stored 237.

Figure 3:
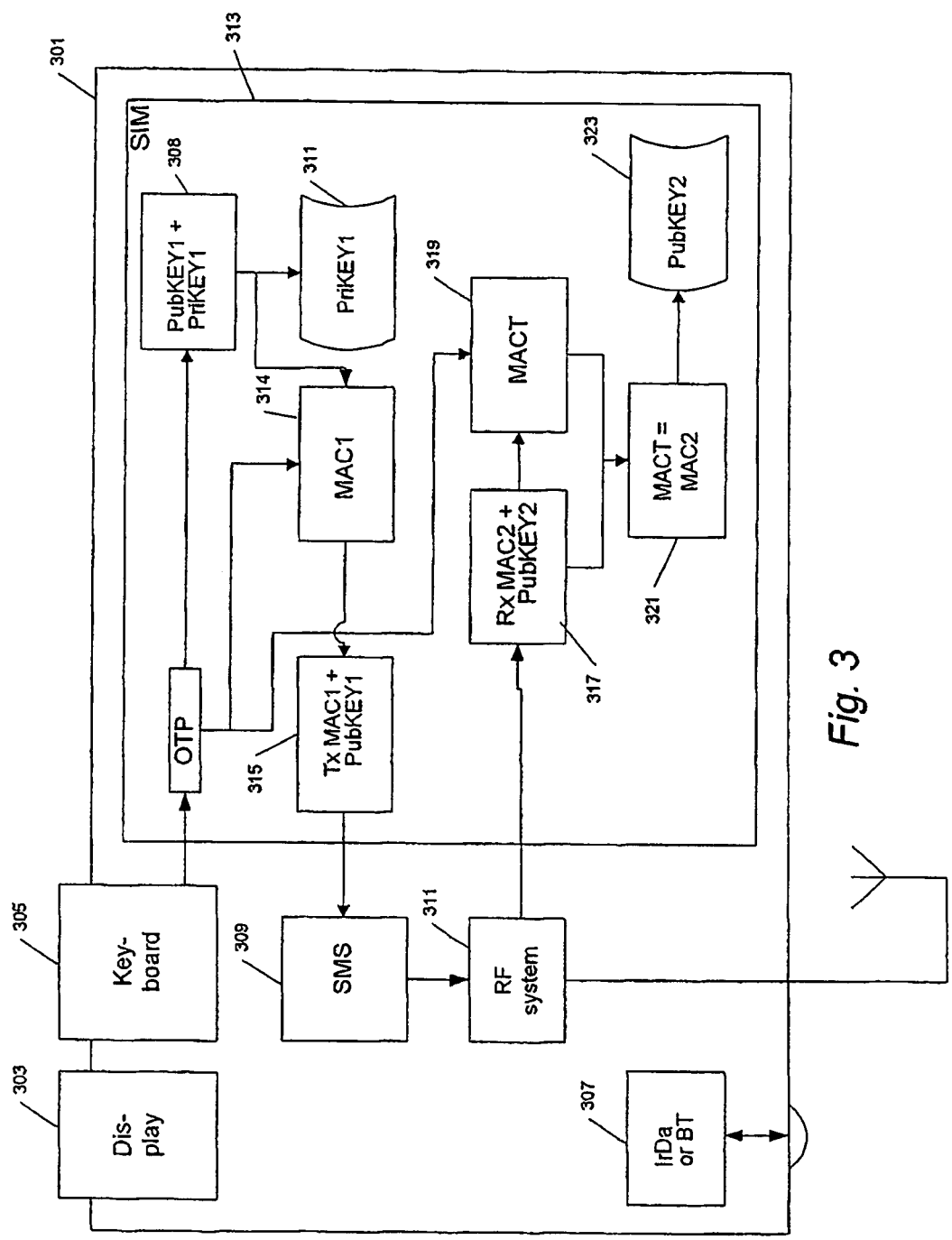
FIG. 3 shows an embodiment of the system parts in the mobile communication device.

FIG. 3 shows an embodiment of the system parts in the mobile communication device. In the illustrated embodiment the mobile communication device is a mobile phone 301. The mobile phone comprises a display 303, a keyboard 305 and a communication link 307. The mobile phone further comprises an SMS module 309, an RF communication system 311 and a Subscriber Identity Module (SIM) 313.

In the following the application placed on the SIM for performing authentication on the mobile phone is described.

The application receives the OTP from the keyboard 305, whereby an asymmetric key pair is generated 309. The asymmetric key pair comprises a private key (PriKEY1) and a public key (PubKEY1). The private key is stored in a tamper resistant location 311 on the SIM-card and the public key is used for generating 313 a message authentication code (MAC1). Generation of the authentication code is achieved using both the OTP and the public key. The generated authentication code and the public key are transmitted 315 to the bank server as a SMS message via a common network, such as GSM.

The application is further adapted for receiving a public key (PubKEY2) and an authentication code (MAC2) from e.g. the bank server. The received public key and the OTP 307 are then used for generating 319 a temporary message authentication code (MACT) in a way similar to the code generation at the bank server.

The authentication is checked by comparing 321 the received authentication code (MAC2) with the temporary authentication code (MACT2) and if the codes correspond to each other, according to a predefined set of rules, the message is authenticated and the mobile station can trust that the received information is from the bank server and the public key is stored 323.

An application of the above invention is when a first party further acts as a Certificate Authority, CA. After the communication has been authenticated the second party can download a new certificate for the mobile communication device or a link to the new certificate of the mobile communication device.

Another application is when the above communication authentication is ready, then a method for limited information exchange, optimised size-wise, with authentication and non-repudiation can be used: The authenticated, signed, information will not be hashed, but include all information without further overhead since not both information and signature need to be transferred, but only the signature.

The typical scenario for the present invention is that a user has various accounts with several banks and wishes to be able to initiate payments from these various accounts in a manner similar to traditional home-banking solutions over the Internet. However, if the user has only one bank, no Public Key Infrastructure (PKI) is required—all that needs to be done is that the public key of the user, generated by the mobile device, be registered in a secure database at the bank and its integrity be protected. Similar, even if the user has several banks, the communication with the banks are independent, and he/she could use the same public key with all banks, but without the use of certificates.

The advantages of this approach are the following: Firstly, there is no requirement for a costly PKI solution where all users are registered with a public key certificate, typically built on the X.509 standard, or perhaps the EMV standard. Secondly, much less needs to be stored locally e.g. on the SIM-card of a mobile station, which consequently only needs very limited appropriate memory, such as EEPROM, to store the private key, and the account identification.

Generally, the following should be noted:

The term 'bank server' associated with reference numeral 203 is also denoted a 'key managing computer'. This can be a computer system comprised of a first portion dedicated to the exchange of public keys with the mobile stations/smart cards and authentication during registration of a smart card and/or user; and a second portion dedicated to transactions requiring authentication. In a typical application of the present invention, the key managing server will be able to serve a multitude of users with individual smart cards.

The term 'predefined generation method' designates the method used in the code generator 221, 215 and 227, 233. In connection therewith, implementation of 'same predefined generation method' requires no special means for achieving this except that the provider of the smart card and the provider of the key managing server must ensure that 'predefined generation methods' actually provides the same output for the same input. Primarily, the code generators 221 and 215 must comply to the 'same predefined generation method'. Likewise, the code generators 227 and 233 must comply with the 'same predefined generation method'. Secondarily, all four code generators comply with the 'same predefined generation method'.

The term 'mobile station' comprises mobile cellular phones, Personal Digital Assistants (PDAs), etc. A mobile station may be provided with means for local data transfer e.g. via an infrared port (e.g. according to IrDa) and/or Bluetooth (tm).

The term 'One time password' designates a password intended for a single use typically in a registration process. Such a password may be a sequence of characters and/or numbers and/or other symbols. This is basically represented by a sequence of bit values.

The invention claimed is:

1. A method of distributing the public key of an asymmetric key pair with a private key and the public key from a mobile station to a key managing computer, the method comprising the steps of:
communicating a password (OTP) from the key managing (203) computer to the mobile station (209) of a registered user (201) by means of a secure channel (202) to thereby provide a shared secret;
at the mobile station and at the key managing computer, generating a first code (MAC1) and a second code (MACT1), respectively, based on the same predefined generation method, which codes (MAC1; MACT1) are generated from the password (OTP);
by means of the mobile station (209), transmitting the public key and the first code (MAC1) to the key managing computer (203);
at the key managing computer (203), receiving the public key and the first code (MAC1) from the mobile station (209);
checking the authenticity of the registered user (201) based on comparing the first code (MAC1) and the second code (MACT1).

2. A method according to claim 1, wherein said first and second codes (MAC1; MACT1) are generated from the password (OTP) in combination with the said public key as a Message Authentication Code.

3. A method according to claim 1, wherein said asymmetric key pair is generated by said mobile station (209), and the generation of said asymmetric key pair is initiated by the password (OTP) being entered into the mobile station (209).

4. A method according to claim 3, wherein a user authentication is attached to the private key during generation of said asymmetric key pair, where the user authentication must be entered when the private key is to be accessed.

5. A method according to claim 1, wherein the predefined generation method comprises the following steps:
generating a string at least comprising said password (OTP); and
hashing the string using a predefined hashing function.

6. A method according to claim 5, wherein the predefined hashing function is a secure hash algorithm.

7. A method according to claim 1, further comprising the step of:
if, by comparing the first code (MAC1) and the second code (MACT1), a match is found, the registered user (201) is authenticated and a further code (MAC2), which is generated from a second public key in a second asymmetric key pair of the key managing computer (203) and the password (OTP), is transmitted to the mobile station (209).

8. A method according to claim 7, further comprising the step of:
at the mobile station (209) generating a temporary code (MACT2) based on the second public key and the password (OTP) by means of the predefined generation method;
comparing the further code (MAC2) and the temporary code (MACT2);
if, by comparing the further code (MAC2) and the temporary code (MACT2), a match is found, the mobile station (209) accepts the second public key for subsequent secure communication with the key managing computer.

9. A method according to claim 1, wherein the secure channel (202) is a channel where the mobile station (209) and the key managing computer (203) are authenticated to each other.

10. A method according to claim 1, wherein the mobile station (209) comprises a smart card and wherein the private key is generated and stored at a first application on the smart card and wherein the first code (MAC1) is generated at a second application at the smart card.

11. A method according to claim 10, wherein the smart card is a Subscriber Identity Module (SIM card).

12. A method according to claim 1, wherein the key managing computer (203) represents at least one financial institute or bank, and the mobile station is registered to a costumer with an account in said at least one financial institute.

13. A method according to claim 1, wherein the communication between the mobile station (209) and the key managing computer (203) is performed by a cellular network.

14. An application module arranged on a smart card, which is registered to a user for use of the smart card in a mobile station; and wherein the application module is configured to
receive a password entered by the user, and to
generate and store an asymmetric key pair with a public key and a private key
characterized in that the application module further is configured to:
generate a first code based on the same predefined generation method as is used for generating a second code at a specified key managing computer, which first and second codes are generated from the password as a Message Authentication Code;
via the mobile station, transmit the public key and the first code to the specified key managing computer to enable authentication of the registered user's public key, based on comparing the first and second code.

15. An application module according to claim 14, configured to:
generate the private key and the public key;
generate the code; and
perform encryption and/or decryption operations of messages based on the private and/or public key.

16. An application module according to claim 14, wherein the generation of the private key involves identification information (OTP) transmitted via a pre-established secure channel over the Internet, and where the OTP is entered into the mobile station via a keypad of the mobile station.

17. An application module according to claim 14, wherein said first and second codes are generated from the password in combination with the public key.

18. An application module according to claim 14, wherein said asymmetric key pair is generated by said mobile station, and the generation of said asymmetric key pair is initiated by the password being entered into the mobile station.

19. An application module according to claim 14, wherein a user authentication is attached to the private key during generation of said asymmetric key pair, where the user authentication must be entered when the private key is to be accessed.

20. An application module according to claim 14, wherein the predefined generation method comprises the following steps, generating a string at least comprising said password,
hashing the string using a predefined hashing function.

21. An application module according to claim 20, wherein the predefined hashing function is a secure hash algorithm.

22. An application module according to claim 1, configured to:

receive the password and a further code, which is generated from a second public key in a second asymmetric key pair of the key managing computer;

generate a temporary code based on the received public key, which is received from the specified key managing computer, and the password by means of the predefined generation method;

compare the further code and the temporary code;

if, by comparing the further code and the temporary code, a match is found, the mobile station accepts the second public key for subsequent secure communication with the key managing computer.

* * * * *